US012723619B2

(12) United States Patent
Futae et al.

(10) Patent No.: US 12,723,619 B2
(45) Date of Patent: Sep. 1, 2026

(54) GAS BEARING DEVICE

(71) Applicant: MITSUBISHI HEAVY INDUSTRIES ENGINE & TURBOCHARGER, LTD., Sagamihara (JP)

(72) Inventors: Takaya Futae, Tokyo (JP); Hideaki Nishida, Tokyo (JP); Shuichi Isayama, Tokyo (JP); Naomichi Shibata, Sagamihara (JP); Shingo Tanaka, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 109 days.

(21) Appl. No.: 18/839,237

(22) PCT Filed: Feb. 22, 2022

(86) PCT No.: PCT/JP2022/007295
§ 371 (c)(1),
(2) Date: Aug. 16, 2024

(87) PCT Pub. No.: WO2023/162018
PCT Pub. Date: Aug. 31, 2023

(65) Prior Publication Data

US 2025/0163957 A1 May 22, 2025

(51) Int. Cl.
*F16C 17/02* (2006.01)

(52) U.S. Cl.
CPC .................................. *F16C 17/024* (2013.01)

(58) Field of Classification Search
CPC ..................................................... F16C 17/024
See application file for complete search history.

(56) References Cited

U.S. PATENT DOCUMENTS 4,465,384 A 8/1984 Heshmat et al.
5,911,510 A 6/1999 Saville
(Continued)

FOREIGN PATENT DOCUMENTS

CN 112648283 A 4/2021
JP 2005-9556 A 1/2005
(Continued)

OTHER PUBLICATIONS

The International Search Report (PCT/ISA/210) issued in PCT/JP2022/007295, mailed on Mar. 29, 2022.
(Continued)

*Primary Examiner* — James Pilkington
(74) *Attorney, Agent, or Firm* — Birch, Stewart, Kolasch & Birch, LLP

(57) ABSTRACT

A gas bearing device having a housing provided around a rotary shaft and forms an annular gap between the housing and the rotary shaft; a top foil provided to surround the rotary shaft within the annular gap; and a backup foil provided to surround the top foil on the outside of the top foil within the annular gap. The backup foil member includes: a middle side backup foil disposed in a middle side region that includes at least a center position in the axial direction of the rotary shaft, made up of a plurality of layers of back foils; and end side backup foils disposed in end portion side regions on both sides of the middle side region in the axial direction, made up of a single layer or a plurality of layers of backup foils having a number of layers less than that in the middle side region.

10 Claims, 11 Drawing Sheets

E-E SECTION

(56) References Cited

U.S. PATENT DOCUMENTS

| | | | | |
|---|---|---|---|---|
| 6,964,522 | B2 * | 11/2005 | Kang | F16C 27/02 384/106 |
| 12,331,786 | B2 * | 6/2025 | Sung | F16C 17/024 |
| 2009/0185766 | A1 | 7/2009 | Dubreuil et al. | |
| 2018/0051745 | A1 | 2/2018 | Himmelmann | |
| 2021/0010531 | A1 | 1/2021 | Omori | |

FOREIGN PATENT DOCUMENTS

| | | | |
|---|---|---|---|
| KR | 10-0648637 | B1 | 11/2006 |
| KR | 10-2022-0119940 | A | 8/2022 |

OTHER PUBLICATIONS

German Office Action for German Application No. 11 2022 006 172.3, dated Mar. 4, 2026, with English translation.

* cited by examiner

C–C SECTION

A-A SECTION

B-B SECTION

E-E SECTION

D-D SECTION

IN C VIEW

GAS BEARING DEVICE

TECHNICAL FIELD

The present disclosure relates to a gas bearing device.

BACKGROUND ART

In a rotary machine such as an electric compressor, a gas bearing, which is a type of oil-less bearing, is employed in some cases in order to avoid contamination of compressed air due to mixing of a lubricant with the compressed air. The gas bearing supports a rotary shaft by forming a gas film between the rotary shaft and a bearing surface. However, since a lubricant is a gas, a bearing load capacity is lower than that of an oil bearing. Therefore, it is necessary to generate a gas film pressure as efficiently as possible between the rotary shaft and the bearing. To achieve this, the bearing surface is formed of a thin plate (top foil) deformable to follow the gas film pressure, and a back surface of the top foil is elastically supported by a plate-shaped backup foil.

In a pressure distribution generated on the bearing surface of the gas bearing, a central side region in an axial direction of the rotary shaft (hereinafter, also simply referred to as an "axial direction") is a high-pressure region. Therefore, the central side region is likely to be deformed toward a backup foil side, while conversely, an end portion side region is likely to be deformed to warp toward a rotary shaft side. Consequently, there is a concern of wear or damage to the end portion side region of the top foil coming into contact with the rotary shaft.

PTL 1 discloses a method for reducing a plate thickness of an end portion side region of a top foil or a backup foil in an axial direction as compared with a plate thickness of a central side region in order to prevent the end portion side region of the top foil from coming into partial contact with a rotary shaft, in a gas bearing. Accordingly, by reducing stiffness of the end portion side region of these foil members and increasing displacement of the end portion side region of the top foil in a direction away from the rotary shaft due to a gas film pressure acting on a bearing surface, a bearing gap of the end portion side region is ensured, thereby eliminating wear or damage due to partial contact.

CITATION LIST

Patent Literature

[PTL 1] Japanese Unexamined Patent Application Publication No. 2005-9556

SUMMARY OF INVENTION

Technical Problem

Means disclosed in PTL 1 requires precision processing, such as plate thickness adjustment in which the plate thickness varies between an axial central side region and an axial end portion side region of the top foil or the backup foil. This poses a problem of complicating the processing of the top foil and the backup foil.

The present invention has been made in view of the above-described circumstances, and an object of the present invention is to prevent wear or damage to a top foil through a simple method that does not require complicated processing of the top foil and a backup foil.

Solution to Problem

In order to achieve the above-described object, according to one aspect of a gas bearing device described in the present disclosure, there is provided a gas bearing device including: a housing that is provided around a rotary shaft and that forms an annular gap with the rotary shaft; a top foil that is provided in the annular gap to surround the rotary shaft; and a backup foil member that is provided on an outer side of the top foil in the annular gap to surround the top foil and that is configured to elastically support the top foil, in which the backup foil member includes a central side backup foil that includes a plurality of layers of backup foils and that is disposed in a central side region including at least a center position in an axial direction of the rotary shaft, and an end portion side backup foil that includes a single layer or a plurality of layers of backup foils fewer than those of the central side region and that is disposed in end portion side regions located on both sides of the central side region in the axial direction.

Advantageous Effects of Invention

According to one aspect of the gas bearing device described in the present disclosure, by adjusting the number of backup foils constituting each of the central side backup foil and the end portion side backup foil in the axial direction, a bending stiffness of the central side backup foil can be made greater than a bending stiffness of the end portion side backup foil. Therefore, the deformation of the central side top foil due to the gas film pressure added to the bearing surface of the top foil can be suppressed, so that it is possible to prevent the end portion side region of the top foil from coming into contact with the rotary shaft to cause wear or damage, and a need for plate thickness adjustment of each of the top foil and the backup foil is eliminated, thereby enabling cost reduction in manufacturing these foil members.

BRIEF DESCRIPTION OF DRAWINGS

FIG. 6 is a front view of an unfolded top foil according to one embodiment.

FIG. 7 is a side view of the unfolded top foil shown in FIG. 6.

DESCRIPTION OF EMBODIMENTS

Figure 1:
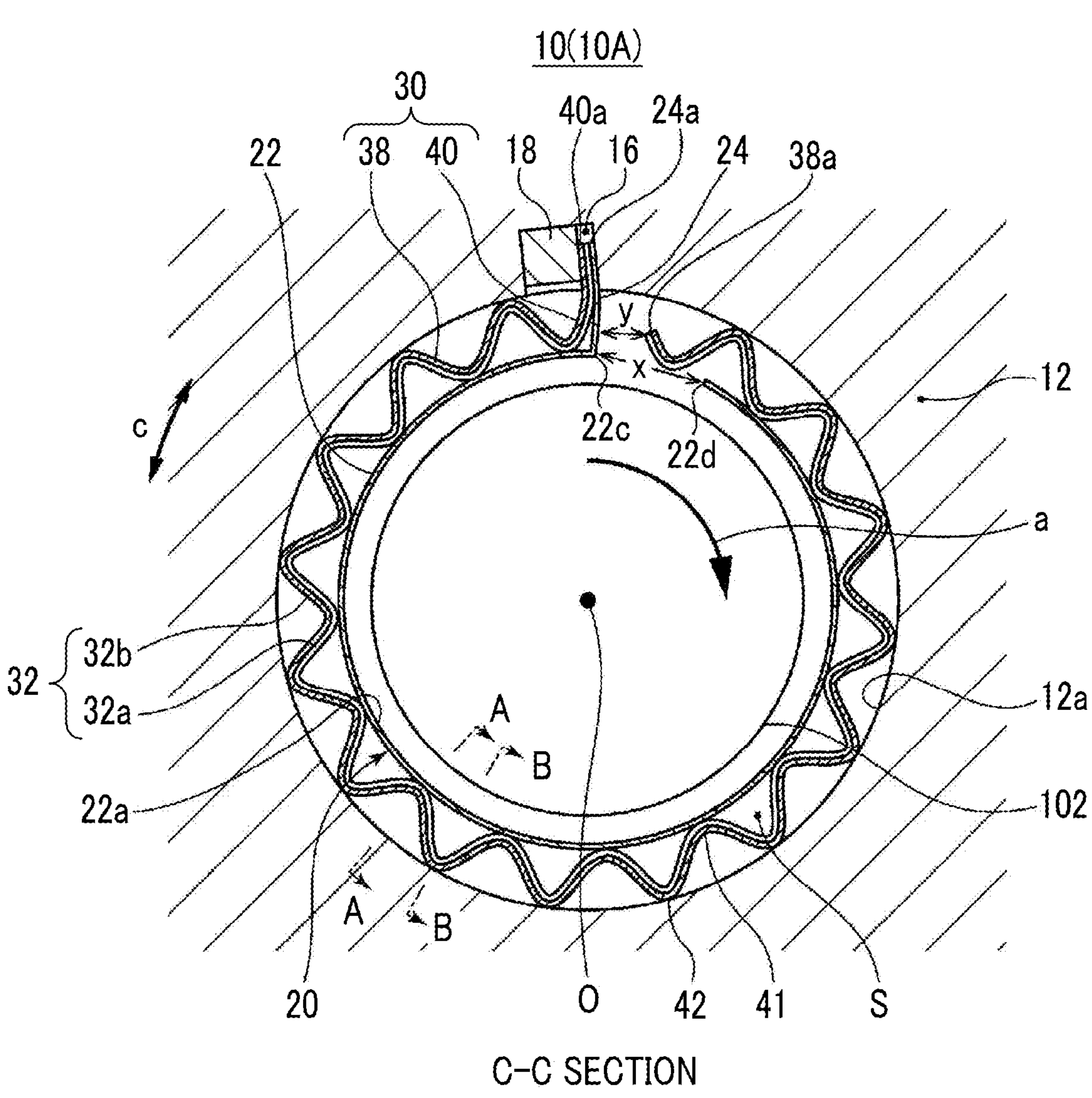
FIG. 1 is a front sectional view (a sectional view taken along line C-C in FIG. 2) showing a gas bearing device according to one embodiment.

Hereinafter, some embodiments of the present invention will be described with reference to the accompanying drawings. Note that dimensions, materials, shapes, relative dispositions, and the like of components described in the embodiments or shown in the drawings are not intended to limit the scope of the present invention but are merely exemplary.

For example, an expression representing a relative or absolute disposition, such as "in a certain direction", "along a certain direction", "parallel", "orthogonal", "center", "concentric", or "coaxial", does not only strictly represent such a disposition, but also represents a tolerance or a state of being relatively displaced with an angle or a distance to the extent that the same function can be obtained.

For example, an expression representing a state in which things are equal to each other, such as "identical", "equal", or "homogeneous", does not only strictly represent the equal state, but also represents a tolerance or a state in which there is a difference to the extent that the same function can be obtained.

For example, an expression representing a shape, such as a quadrangular shape or a cylindrical shape, does not only represent a shape such as a quadrangular shape or a cylindrical shape in a geometrically strict sense, but also represents a shape including an undulation portion, a chamfered portion, and the like within a range in which the same effect can be obtained.

Meanwhile, expressions such as "comprising", "being provided with", "being equipped with", "including", or "having" for one component are not exclusive expressions excluding the presence of other components.

First and Second Embodiments

Figure 2:
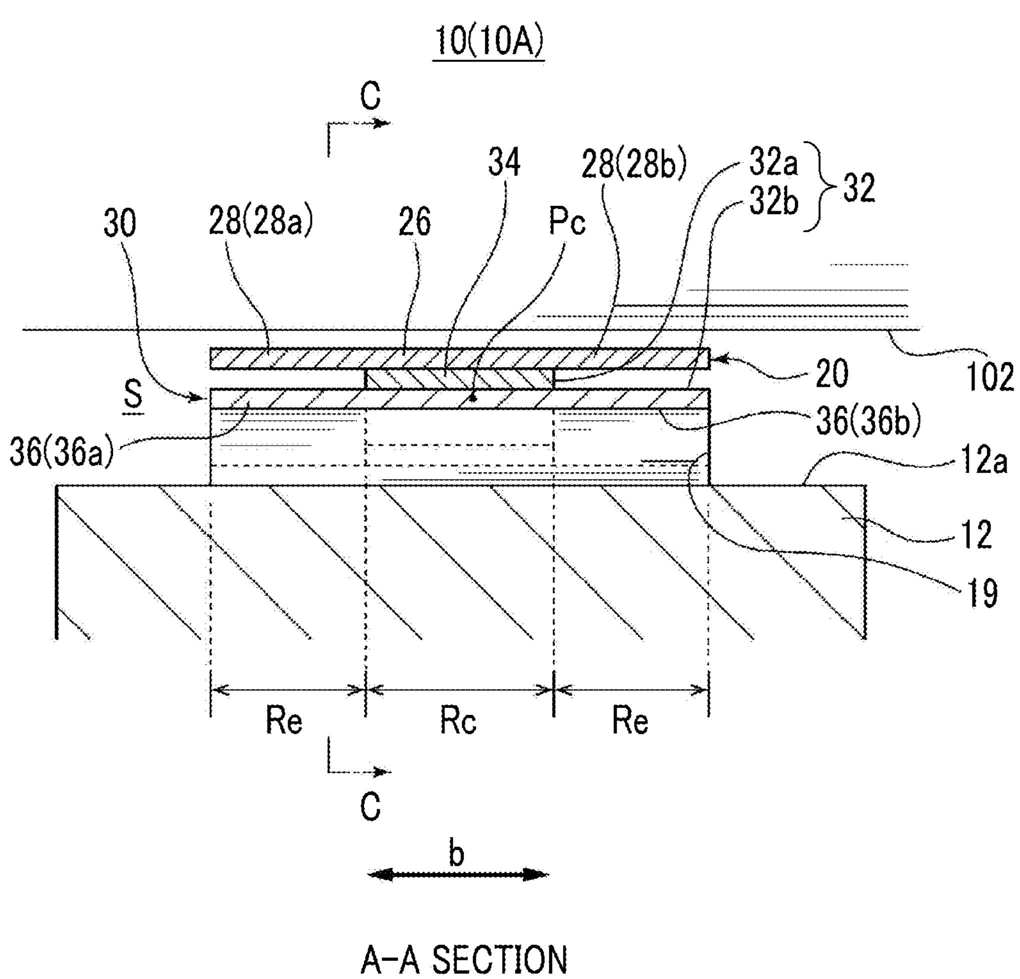
FIG. 2 is a schematic side sectional view taken along line A-A in FIG. 1.
Figure 3:
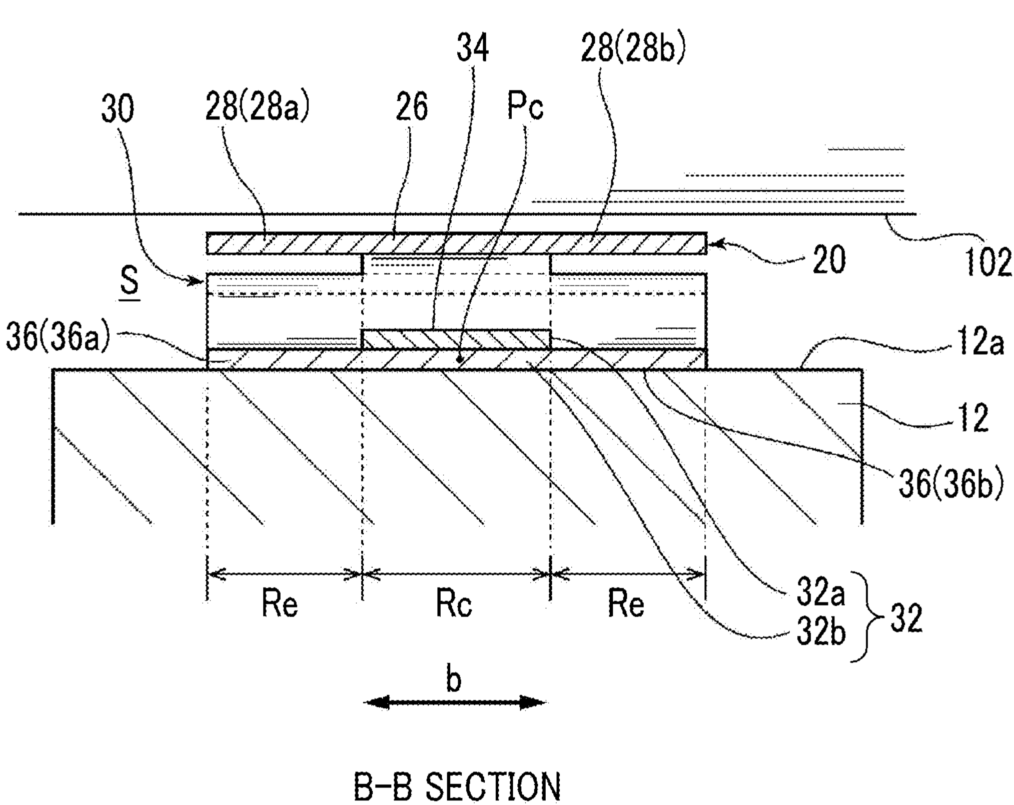
FIG. 3 is a schematic side sectional view taken along line B-B in FIG. 1.
Figure 4:
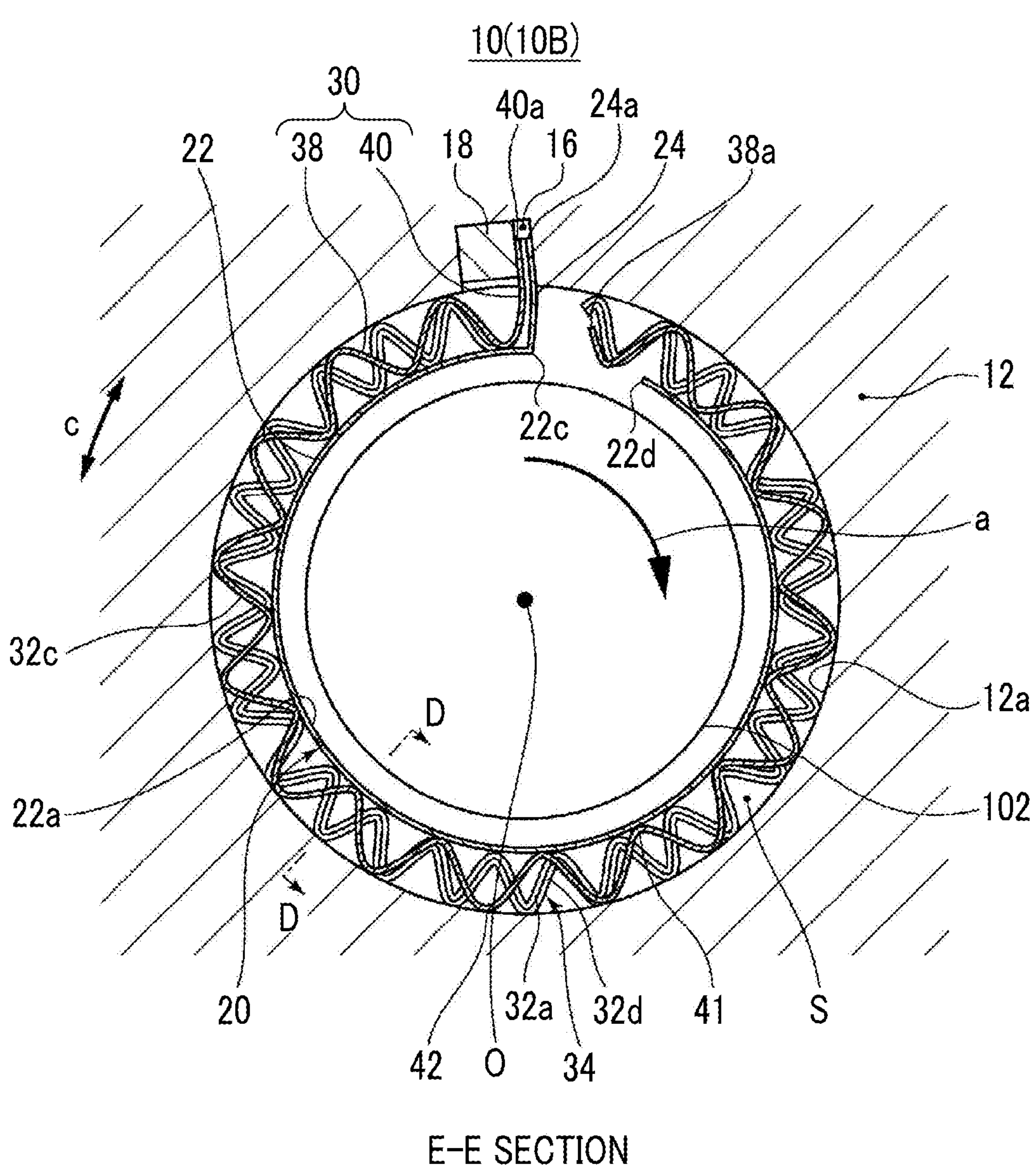
FIG. 4 is a front sectional view (a sectional view taken along line E-E in FIG. 5) showing a gas bearing device according to one embodiment.
Figure 5:
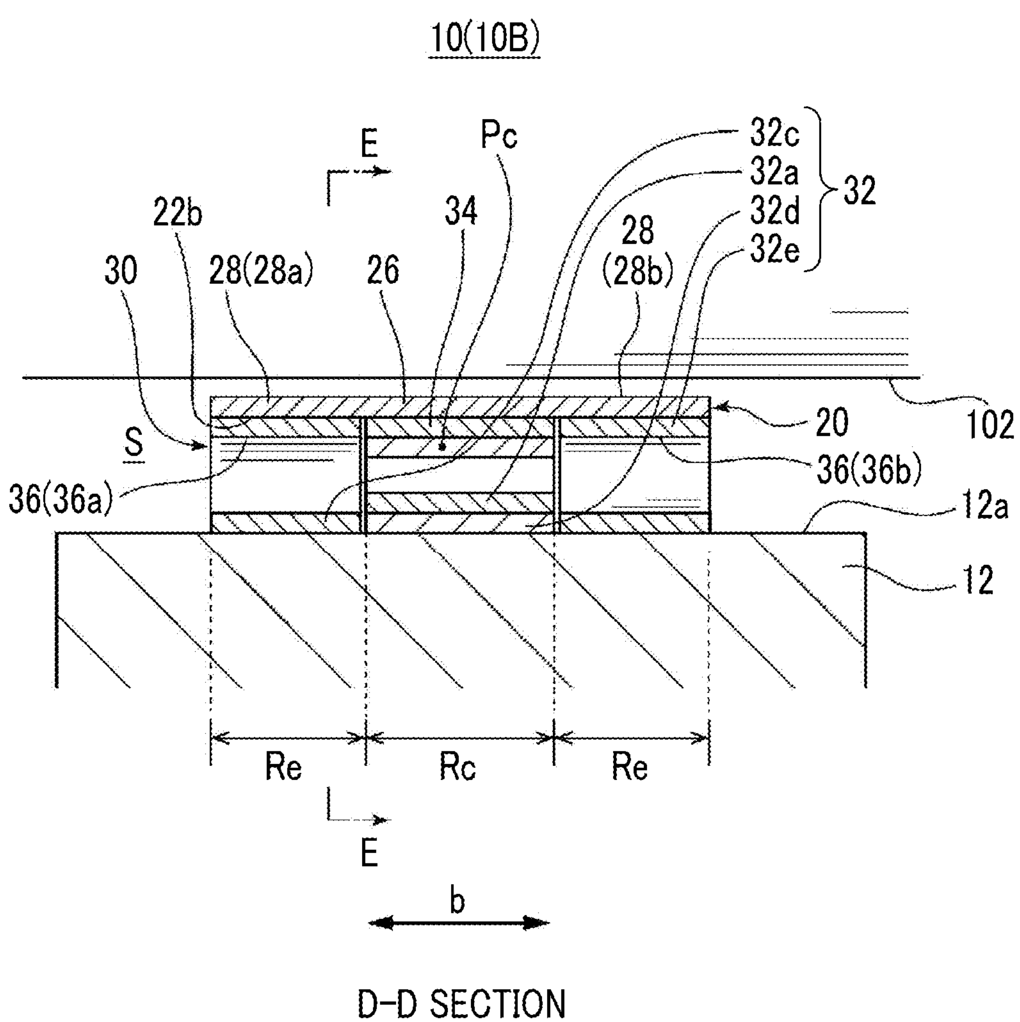
FIG. 5 is a schematic side sectional view taken along line D-D in FIG. 4.

FIG. 1 is a front sectional view (a sectional view taken along line C-C in FIG. 2) of a gas bearing device 10 (10A) according to one embodiment, FIG. 2 is a schematic side sectional view taken along line A-A in FIG. 1, and FIG. 3 is a schematic side sectional view taken along line B-B in FIG. 1. FIG. 4 is a front sectional view (a sectional view taken along line E-E in FIG. 5) showing a part of the gas bearing device 10 (10B) according to another embodiment, and FIG. 5 is a schematic side sectional view taken along line D-D in FIG. 4.

In the gas bearing device 10 (10A, 10B) shown in FIGS. 1 to 5, a rotary shaft 102 provided in a rotary machine (not shown, for example, an electric compressor, a turbocharger, or the like) is accommodated inside a housing 12, and an annular gap S is formed between an outer peripheral surface of the rotary shaft 102 and an inner peripheral surface 12*a* of the housing 12 provided around the rotary shaft 102. A top foil 20 is provided in an inner region of the annular gap S to surround the rotary shaft 102, and a backup foil member 30 is provided on an outer side of the top foil 20 to surround the top foil 20.

In the embodiments shown in FIGS. 1 and 4, the rotary shaft 102 rotates in a direction of an arrow a about a central axis O extending along an axial direction.

In FIGS. 1 to 12, a direction of an arrow b indicates the axial direction of the rotary shaft 102, and a direction of an arrow c indicates a circumferential direction of the rotary shaft 102 (hereinafter, also simply referred to as a "circumferential direction").

As shown in FIG. 1, the top foil 20 includes an arc portion 22 extending along the circumferential direction of the rotary shaft 102, and a fixed portion 24 extending from one end of the arc portion 22 along a radially outer side, in a sectional view. The arc portion 22 extends over most of the region in the circumferential direction and extends over, for example, a region of 75% to 95% in a case where the entire circumference region is considered as 100%. A butting portion (gap) x is formed between one end 22*c* and the other end 22*d* of the arc portion 22. The top foil 20 extends along the axial direction of the rotary shaft 102 and is formed in a substantially cylindrical shape except for the butting portion x. An inner peripheral surface 22*a* of the arc portion 22 forms a bearing surface, and a gas film is formed between the outer peripheral surface of the rotary shaft 102 and the inner peripheral surface 22*a* of the arc portion 22 to lubricate and support the rotary shaft 102. The fixed portion 24 extends along a radial direction of the rotary shaft 102, and an end portion 24*a* of the fixed portion 24 is inserted into a groove portion 16 formed in the inner peripheral surface 12*a* of the housing 12.

The backup foil member 30 is provided to surround the top foil 20 from the outer side of the top foil 20 and is configured to elastically support the top foil 20. The top foil 20 is deformed in the radial direction of the rotary shaft 102 according to a pressure applied by the gas film formed between the rotary shaft 102 and the top foil 20 to the inner peripheral surface 22*a* of the top foil 20, and the backup foil member 30 elastically supports the deformed top foil 20, thereby holding the above-described gas film between the rotary shaft 102 and the top foil 20.

The backup foil member 30 includes a central side backup foil 34 that forms a central side region Rc including at least a center position Pc in the axial direction of the rotary shaft 102, and an end portion side backup foil 36 (36*a*, 36*b*) that forms end portion side regions Re located on both sides in the axial direction with respect to the central side region Rc. The center position Pc is a position where the length of the backup foil member 30 from one end to the other end is divided into two equal parts in the axial direction. The central side backup foil 34 is configured with a laminate of two or more layers of plate-shaped backup foils 32, and the end portion side backup foil 36 is composed of a single-layer backup foil 32, or a plurality of layers of backup foils 32 with the number of layers being fewer than that of a plurality of layers of backup foils 32 constituting the central side backup foil 34.

In one embodiment, the top foil 20 has a plate thickness of 0.1 to 0.2 mm, and the backup foil 32 has a plate thickness larger than the plate thickness of the top foil 20.

According to these embodiments, the number of lay-ups of the backup foils 32 in the central side backup foil 34 and the end portion side backup foil 36 is adjusted such that the central side backup foil 34 has more layers, so that a bending stiffness of the central side backup foil 34 can be made greater than a bending stiffness of the end portion side backup foil 36. Consequently, a support strength of the central side backup foil 34 that supports the top foil 20 in the central side region Rc can be made higher than a support strength of the end portion side backup foil 36 that supports the top foil 20 in the end portion side region Re. Therefore, it is possible to suppress the deformation of the top foil 20 in the central side region Rc toward a central side backup foil 34 side due to the gas film pressure. As a result, the deformation in which the end portion side region Re of the top foil 20 warps toward a rotary shaft 102 side can be suppressed, so that it is possible to prevent the top foil 20 in the end portion side region Re from coming into contact with the rotary shaft 102 to cause wear or damage.

In addition, by adjusting the number of lay-ups of the backup foils 32 constituting the backup foil member 30, the bending stiffness of each region of the central side and the end portion side of the backup foil member 30 in the axial direction can be adjusted, so that a need for plate thickness adjustment of each individual backup foil 32 is eliminated. Therefore, the processing of the backup foil 32 is facilitated. Further, in a case where a plurality of layers of backup foils 32 are disposed, friction generated between the plurality of layers can efficiently increase the bending stiffness of the backup foil member 30.

Figure 12:
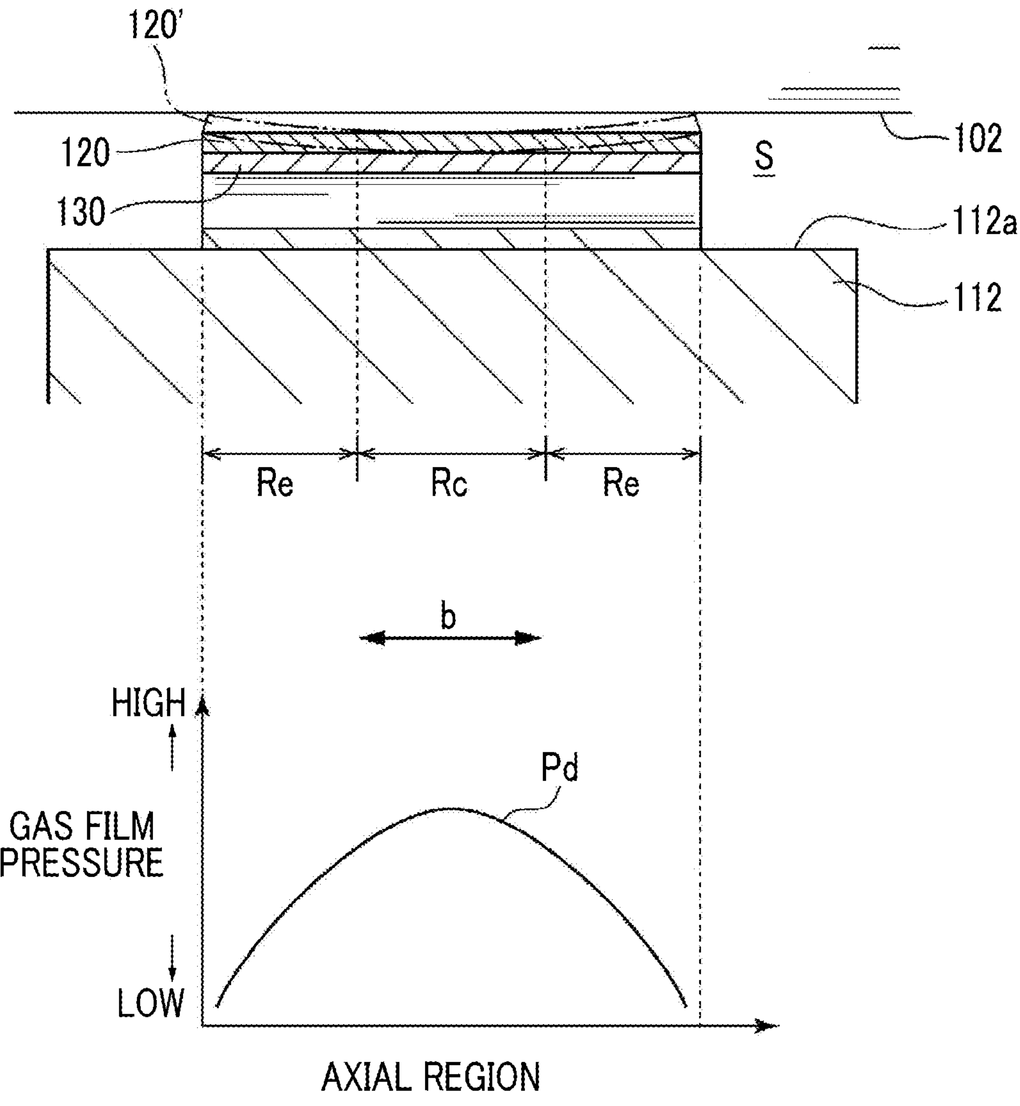
FIG. 12 is a schematic side sectional view of a conventional gas bearing device.

FIG. 12 is a schematic side sectional view showing a part of a conventional gas bearing device 100 as a comparative example. In the gas bearing device 100, the rotary shaft 102 is accommodated inside a housing 112, and the annular gap S is formed between the rotary shaft 102 and an inner peripheral surface 112*a* of the housing 112. The gas bearing device 100 includes a top foil 120 that is provided to surround the rotary shaft 102, and a backup foil member 130 that is provided on an outer side of the top foil 120 to surround the top foil 120 and that is subjected to bending into a corrugated shape. The backup foil member 130 includes a single backup foil having a uniform plate thickness along the axial direction and has a uniform bending stiffness in the axial direction.

In the gas bearing device 100, a gas film is formed between the rotary shaft 102 and the top foil 120, and the gas film pressure applied from the gas film to the top foil 120 has a pressure distribution Pd that is high in the central side region in the axial direction. Therefore, the central side region Rc of the top foil 120 in the axial direction is pressed toward a backup foil member 130 side, while conversely, a deformation in which the end portion side region Re warps toward the rotary shaft 102 side as indicated by a reference numeral 120' in FIG. 12 occurs. Consequently, there is a concern of wear or damage to the end portion side region Re of the top foil 120 coming into contact with the rotary shaft 102.

In the embodiment shown in FIG. 1, each of the backup foils 32 constituting the backup foil member 30 includes, in a sectional view, an undulation forming portion 38 extending along the circumferential direction of the rotary shaft 102, and a fixed portion 40 extending from one end of the undulation forming portion 38 to the radially outer side of the rotary shaft 102 and including an end portion 40*a* inserted into the groove portion 16. The undulation forming portion 38 extends over most of the region in the circumferential direction and extends over, for example, a region of 75% to 97% in a case where the entire circumference region is considered as 100%, and a gap butting portion (gap) y is formed between an end portion 38*a* on an undulation forming portion 38 side and the fixed portion 24 of the top foil 20. Each of the backup foils 32 extends along the axial direction of the rotary shaft 102 and is formed in a substantially cylindrical shape except for the gap y. The end portion 40*a* of the backup foil 32 on a fixed portion 40 side is inserted into the groove portion 16.

In the embodiment shown in FIGS. 2 and 3, the central side backup foil 34 is configured with a laminate of two layers, that is, an inner backup foil 32*a* and an outer backup foil 32*b* disposed on an outer side of the inner backup foil 32*a* with respect to the rotary shaft 102, and both of the end portion side backup foils 36 are composed of the single-layer backup foil 32 of only the outer backup foil 32*b*.

The number of lay-ups of the backup foils 32 to be used for the central side backup foil 34 and the end portion side backup foil 36 is not limited to the above-described embodiment. That is, in another embodiment, the end portion side backup foil 36 is composed of a plurality of layers of backup foils 32, and the central side backup foil 34 is composed of the backup foils 32 with a greater number of lay-ups than the number of lay-ups of the backup foils 32 in the end portion side backup foil 36.

In the embodiments shown in FIGS. 1 and 4, the undulation forming portion 38 of each of the backup foils 32 is subjected to bending such that undulations are repeated along the circumferential direction of the rotary shaft 102. Each individual undulation extends along the axial direction and is bent to protrude or retreat in the radial direction of the rotary shaft 102 to form peaks and valleys. In the embodiments shown in FIGS. 1 and 4, the peaks and valleys are formed in a corrugated shape such as a sine curve, but may have a different undulating shape. For example, a rectangular undulation may be used, or a shape such as a parabola may also be used. A peak portion 41 of the undulation formed in this way is disposed to be in contact with the back surface of the top foil 20, and a valley portion 42 is disposed to be in contact with the inner peripheral surface 12*a* of the housing 12, thereby elastically supporting the top foil 20.

In the gas bearing device 10 (10A, 10B) shown in FIGS. 1 to 5, the groove portion 16 extending along the axial direction is formed in the inner peripheral surface 12*a* of the housing 12. The end portion 24*a* of the top foil 20 on a fixed portion 24 side and the end portion 40*a* of the backup foil 32 on the fixed portion 40 side are each inserted into the groove portion 16 and fixed to the groove portion 16. As means for fixing these end portions 24*a* and 40*a* to the groove portion 16, for example, as shown in FIGS. 1 and 4, a spacer 18 having a shape and a dimension tailored to the shape and the dimension of the groove portion 16 is press-fitted and fixed to the groove portion 16.

In the top foil 20 and the backup foil member 30, as described above, the end portions 24*a* and 40*a* are fixed to the groove portion 16, and an axial position is restricted by means for suppressing an axial movement, such as a snap ring (not shown).

In the embodiments shown in FIGS. 1 and 4, the end portion 22*d* of the top foil 20 and the end portion 38*a* of each of the backup foils 32 are free ends. Therefore, the top foil 20 can be further freely deformed with respect to the gas film pressure received from the gas film formed between the top foil 20 and the rotary shaft 102, and the backup foil member 30 can elastically support the deformed top foil 20 to respond to its deformation more flexibly.

In the gas bearing device 10A shown in FIGS. 1 to 3, the outer backup foil 32*b* is formed with the backup foil 32 that is integrally formed from the central side region Rc to the end portion side region Re. Consequently, the manufacturing process of the backup foil member 30 can be simplified, and the handling when the backup foil member 30 is disposed in the annular gap S is facilitated.

In one embodiment, as shown in FIGS. 4 and 5, each of the plurality of backup foils 32 constituting the central side backup foil 34 and each of the backup foils 32 constituting the end portion side backup foil 36 (36*a*, 36*b*) are configured as separate bodies from each other. That is, in the gas bearing device 10B shown in FIGS. 4 and 5, the inner backup foil 32*a* disposed on a side close to the rotary shaft 102, of the two layers of backup foils 32 constituting the central side backup foil 34, is disposed only in the central side region Rc. The outer backup foil laminated on the outer side of the inner backup foil 32*a* includes a backup foil 32*d* disposed in the central side region Rc, and backup foils 32*c* and 32*e* disposed in both of the end portion side regions Re, and each of the backup foils 32*c*, 32*d*, and 32*e* is configured as a separate body.

In addition, as described above, each of the backup foils 32 constituting the undulation forming portion 38 of the backup foil member 30 is subjected to bending such that the undulations are repeated along the circumferential direction, to form the peak portions 41 and the valley portions 42. Further, a pitch of the undulations of the backup foil 32 constituting the undulation forming portion 38 of the central side backup foil 34 is formed to be smaller than a pitch of the undulations of the backup foil 32 constituting the undulation forming portion 38 of the end portion side backup foil 36.

According to this embodiment, the pitch of the undulations of each of the backup foils 32 constituting the undulation forming portion 38 of the central side backup foil 34 is made smaller than the pitch of the undulations of each of the backup foils 32 constituting the undulation forming portion 38 of the end portion side backup foil 36, so that the bending stiffness of the central side backup foil 34 can be further increased with respect to the bending stiffness of the end portion side backup foil 36, as compared with the embodiment shown in FIGS. 1 to 3. Consequently, the warping of the end portion side region Re of the top foil 20 toward the rotary shaft 102 side can be more effectively suppressed. In addition, since the backup foils 32 constituting the central side backup foil 34 and the end portion side backup foil 36 are each configured as a separate body, it is easy to perform processing of forming the undulations having different pitches from each other.

In the embodiment shown in FIGS. 4 and 5, for example, the backup foils 32*c* and 32*e* constituting the end portion side backup foil 36, and the backup foils 32*a* and 32*d* constituting the central side backup foil 34 do not necessarily have the same plate thickness. That is, the plate thickness of each of the backup foils 32*c* and 32*e* constituting the end portion side backup foil 36 need only be smaller than the total value of the plate thicknesses of the backup foils 32*a* and 32*d* constituting the central side backup foil 34. Consequently, since the bending stiffness of the central side backup foil 34 can be made greater than the bending stiffness of the end portion side backup foil 36, the warping of the end portion side region Re of the top foil 20 toward the rotary shaft 102 side can be suppressed.

Further, in the embodiment shown in FIGS. 4 and 5, the inner backup foil 32*a* and the outer backup foil 32*d* constituting the central side backup foil 34 have the same length in the axial direction, but may have different lengths in the axial direction.

In addition, in the embodiment shown in FIGS. 4 and 5, both-end surfaces of the inner backup foil 32*a* and the outer backup foil 32*d* are at the same position in the axial direction, but the both-end surfaces may be at different positions from each other in the axial direction.

In addition, in the embodiment shown in FIG. 5, the backup foils 32*c* and 32*e* constituting the end portion side backup foil 36 have an undulating shape such that the peak portion 41 is in contact with a back surface 22*b* of the top foil 20 and the valley portion 42 is in contact with the inner peripheral surface 12*a* of the housing 12. In this embodiment as well, the bending stiffness of the central side backup foil 34 can be made greater than the bending stiffness of the end portion side backup foil 36.

In one embodiment, each of the backup foils 32 constituting the central side backup foil 34 and the end portion side backup foil 36 (36*a*, 36*b*) is configured with the backup foil 32 having the same plate thickness over the entire axial direction.

That is, in the gas bearing device 10A shown in FIGS. 1 to 3, the backup foils 32*a* and 32*b* have the same plate thickness at least along the axial direction, and in the gas bearing device 10B shown in FIGS. 4 and 5, the backup foils 32*a*, 32*c*, 32*d*, and 32*e* have the same plate thickness at least along the axial direction.

According to this embodiment, in a case where the backup foils 32 constituting the central side backup foil 34 and the end portion side backup foil 36 are manufactured, all the backup foils 32 can be manufactured by using a plate material having a uniform plate thickness and performing simple processing such as cutting, and the need for plate thickness adjustment is eliminated. Therefore, the manufacturing of the backup foil member 30 is further facilitated.

In one embodiment, the central side region Rc of the top foil 20 is formed, and the bending stiffness in the axial direction of a central side top foil 26 supported by the central side backup foil 34 is configured to be greater than the bending stiffness in the circumferential direction.

According to this embodiment, since the bending stiffness in the axial direction of the central side top foil 26 is greater than the bending stiffness in the circumferential direction, the deformation of the central side top foil 26 due to the gas film pressure applied to the inner peripheral surface (the bearing surface) 22*a* of the central side top foil can be suppressed. Consequently, it is possible to reduce the deformation, in which the end portion side region Re of the top foil 20 warps toward the rotary shaft 102 side, to a small amount.

In another embodiment, the top foil 20 is configured such that the bending stiffness in the axial direction is greater than the bending stiffness in the circumferential direction not only in the central side top foil 26 but also in the end portion side region Re. Consequently, since the bending stiffness in the axial direction of the top foil 20 can be further increased, the warping of the end portion side region Re toward the rotary shaft 102 side can be further effectively suppressed.

As means for making the bending stiffness in the axial direction of the top foil 20 greater than the bending stiffness in the circumferential direction, for example, the top foil 20 is made of an anisotropic material (for example, a CFRP material) having a bending stiffness in the axial direction greater than the bending stiffness in the circumferential direction. Consequently, in particular, it is not necessary to perform processing for enhancing the bending stiffness in the axial direction.

<First Modification Example of Top Foil>

Figures 6, 7:
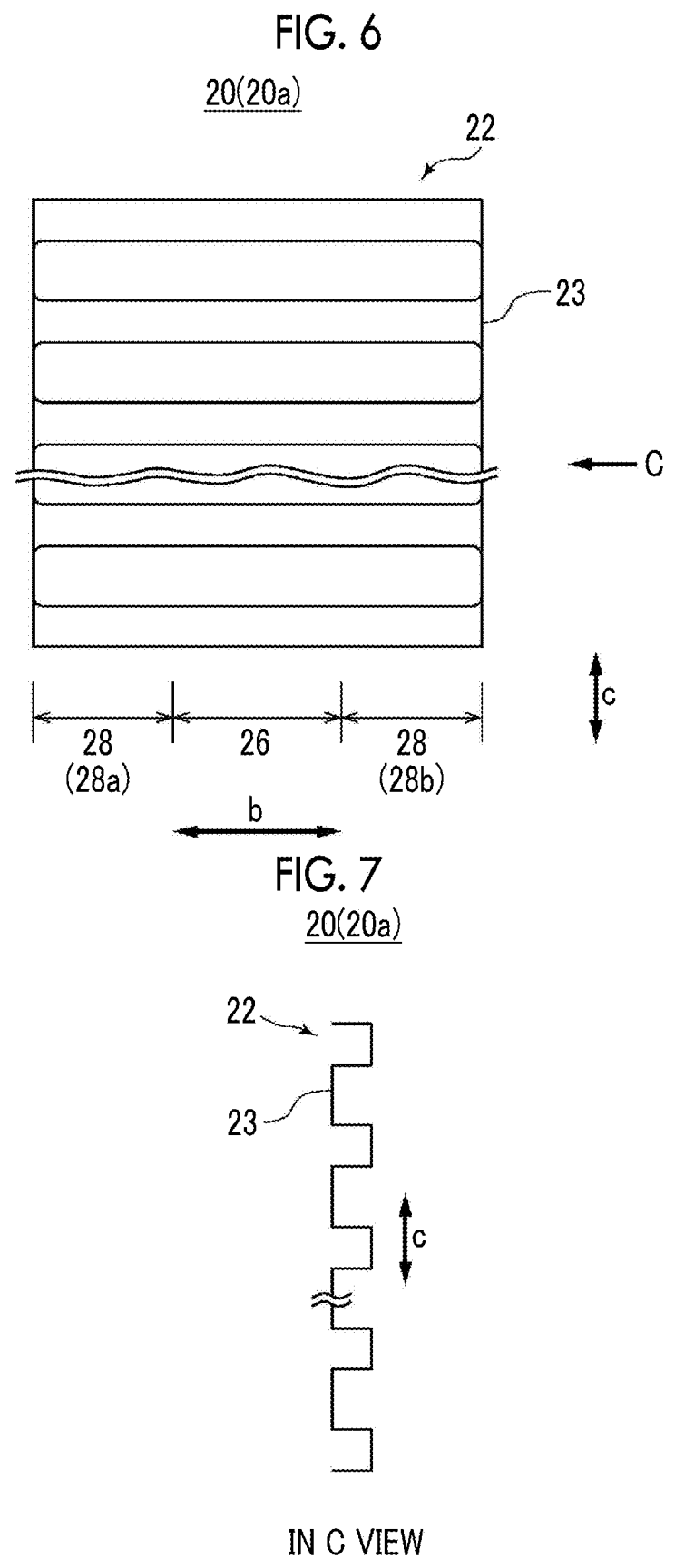

FIGS. 6 and 7 are a front view and a side view in which only the arc portion 22 of a top foil 20*a* according to one embodiment is unfolded, and in these drawings, the fixed portion 24 is not shown.

In the top foil 20*a* according to this embodiment, the arc portion 22 constituting at least the central side top foil 26 is formed in an undulating shape having undulations 23 along the circumferential direction at least in a part of the circumferential direction. In this way, through simple bending such as forming the arc portion 22 of the central side top foil 26 in an undulating shape, the bending stiffness in the axial direction of the central side top foil 26 can be made greater than the bending stiffness in the circumferential direction. Therefore, the degree of freedom in selecting a material forming the top foil 20*a* can be expanded, and it is possible to use an inexpensive material, thereby enabling cost reduction.

In the embodiment shown in FIGS. 6 and 7, the undulating shape is formed in the entire region of the arc portion 22 in the circumferential direction. Therefore, the bending stiffness of the arc portion 22 can be further increased.

In addition, in the embodiment shown in FIGS. 6 and 7, the undulations 23 are formed not only in the central side region Rc but also in the arc portion 22 of the end portion side region Re. Consequently, the bending stiffness of the top foil 20*a* can be maximally increased.

As shown in FIGS. 6 and 7, the arc portion 22 of the top foil 20*a* is disposed in the annular gap S such that the direction of the arrow b is the axial direction of the rotary shaft 102, and is disposed in the annular gap S such that the direction of the arrow c is the circumferential direction of the rotary shaft 102.

In the arc portion 22 of the top foil 20*a* shown in FIGS. 6 and 7, each individual undulation 23 is an undulation extending along the axial direction, and protrudes or retreats in the radial direction of the rotary shaft 102 to form peaks and valleys. As shown in FIGS. 6 and 7, the shape of the undulation 23 may be a rectangular undulation including a flat surface or may be an undulation having a different shape. For example, a corrugated-shaped undulation such as a sine curve may be used, or an undulation having a shape such as a parabola may also be used.

Third Embodiment

<Second Modification Example of Top Foil>

Figure 8:
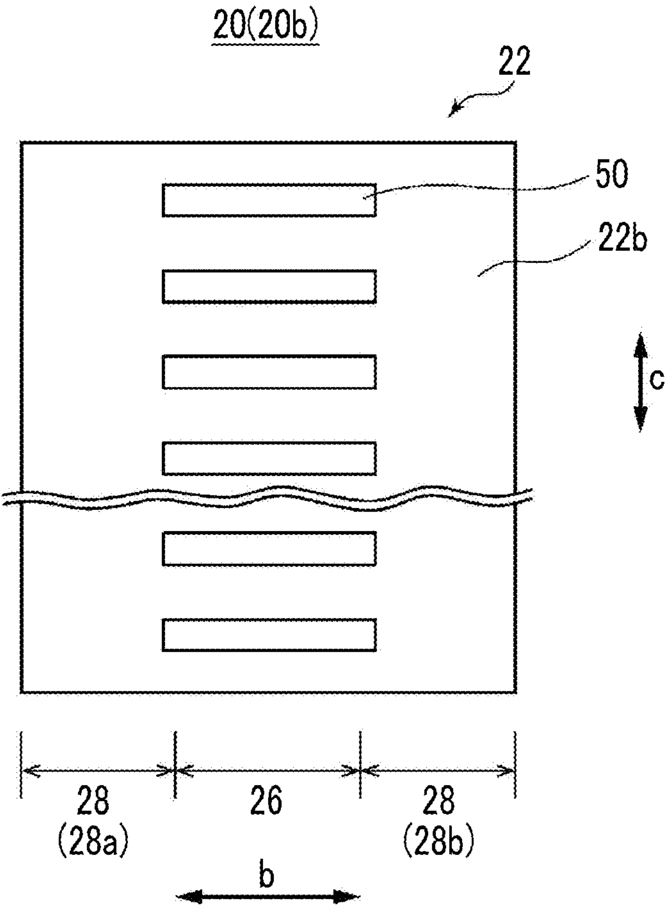
FIG. 8 is a rear view of an unfolded top foil according to one embodiment.
Figure 9:
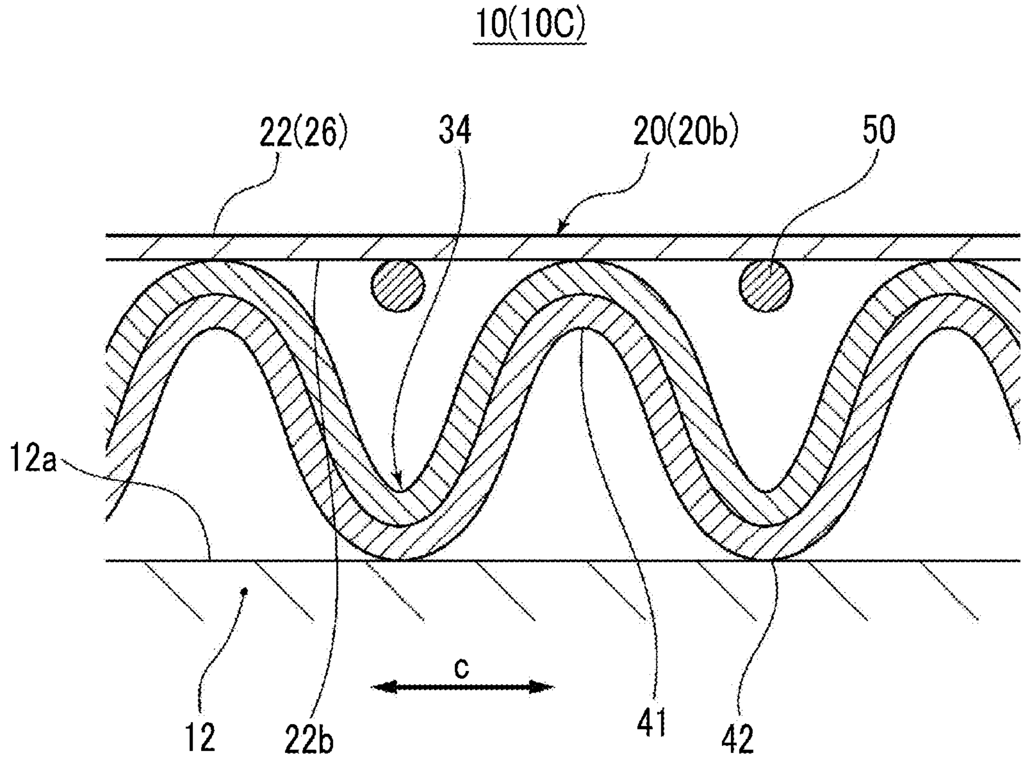
FIG. 9 is an enlarged front sectional view of a part of a gas bearing device including the top foil shown in FIG. 8.

FIG. 8 is a front view in which the back surface 22*b* of the arc portion 22 of a top foil 20*b* according to one embodiment is unfolded, and FIG. 9 is an enlarged front sectional view of a part of a gas bearing device 10C including the top foil 20*b*.

In the top foil 20*b* according to this embodiment, a plurality of rod-shaped members 50 are provided on the back surface 22*b* (a surface facing the central side backup foil 34) of the arc portion 22 of the central side top foil 26. Each of the plurality of rod-shaped members 50 extends along the axial direction (the direction of the arrow *b*) and is discretely disposed along the circumferential direction. In this embodiment, by providing the rod-shaped member 50, the bending stiffness in the axial direction of the central side top foil 26 can be increased more than that in the circumferential direction. Consequently, it is possible to effectively suppress the deformation in which the end portion side region Re of the top foil 20 warps toward the rotary shaft 102 side.

In this embodiment, the rod-shaped member 50 is provided only on the back surface 22*b* of the arc portion 22 of the central side top foil 26, but in another embodiment, the rod-shaped member 50 may be provided over the entire region of the back surface 22*b* of the arc portion 22 including the central side region Rc and the end portion side region Re. Consequently, the overall bending stiffness in the axial direction of the top foil 20*b* can be further increased.

A cross-section of the rod-shaped member 50 has, for example, a circular shape, a rectangular shape, or another shape.

In addition, in the embodiment shown in FIG. 8, the plurality of rod-shaped members 50 are disposed to extend substantially parallel along the axial direction (the direction of the arrow *b*) of the rotary shaft 102, but the plurality of rod-shaped members 50 may be slightly inclined with respect to the axial direction of the rotary shaft 102. For example, the rod-shaped member is attached with an inclination of 30° or less with respect to the axial direction.

In the embodiment shown in FIG. 9, the peak portion 41 of the undulation forming portion 38 of the central side backup foil 34 is disposed to be in contact with the back surface 22*b* of the arc portion 22 of the central side top foil 26, and the valley portion 42 of the central side backup foil 34 is disposed to be in contact with the inner peripheral surface 12*a* of the housing 12. At a circumferential middle position between a plurality of peak portions 41 (for example, at a position where the distance between the peak portions 41 is divided into two substantially equal parts), each rod-shaped member 50 is disposed on the back surface 22*b* of the arc portion 22 of the central side top foil 26 to extend along the axial direction. According to this embodiment, the rod-shaped member 50 can be disposed on the back surface 22*b* of the arc portion 22 of the central side top foil 26 without interfering with the undulation forming portion 38 of the central side backup foil 34.

In one embodiment, in the gas bearing device 10C shown in FIG. 8, the plurality of rod-shaped members 50 are made of a material having a thermal expansion coefficient smaller than the thermal expansion coefficient of the material forming the arc portion 22 of the central side top foil 26.

According to this embodiment, the thermal expansion coefficient of the rod-shaped member 50 is smaller than the thermal expansion coefficient of the arc portion 22 of the central side top foil 26. Therefore, in a case where the rotary machine (not shown) including the gas bearing device 10C operates, and the temperature of the gas bearing device 10C is raised from a non-operation state (normal temperature), the central side top foil 26 is deformed to warp in a direction away from the rotary shaft 102, particularly on the axial end portion side, because of the difference in the thermal expansion coefficients between the arc portion 22 of the central side top foil 26 and the rod-shaped member 50. Consequently, since the deformation in which the axial end portion side region Re of the top foil 20*b* warps toward the rotary shaft 102 side is suppressed, it is possible to suppress the contact of the end portion side region Re of the top foil 20*b* with the rotary shaft 102.

<First Modification Example of Backup Foil Member>

In one embodiment, each of the backup foils 32 constituting the central side backup foil 34 is configured such that the bending stiffness in the axial direction is greater than the bending stiffness in the circumferential direction at least in the undulation forming portion 38.

According to this embodiment, since the bending stiffness in the axial direction of the central side backup foil 34 is greater than the bending stiffness in the circumferential direction, the support strength of the central side backup foil 34 that supports the central side top foil 26 from the outer side can be enhanced. Consequently, it is possible to suppress the deformation of the central side top foil 26 in the direction away from the rotary shaft 102 due to the gas film pressure received by the inner peripheral surface 22*a* (bearing surface) of the top foil 20. Therefore, it is possible to suppress the deformation in which the end portion side region Re of the top foil 20 warps toward the rotary shaft 102 side, thereby suppressing wear or damage to the end portion side region Re of the top foil 20 coming into contact with the rotary shaft 102.

In one embodiment, each of the backup foils 32 constituting the central side backup foil 34 is made of an anisotropic material (for example, a CFRP material or the like) having a bending stiffness in the axial direction greater than the bending stiffness in the circumferential direction, at least in the undulation forming portion 38.

According to this embodiment, since the material itself forming the central side backup foil 34 is made of the anisotropic material having a bending stiffness in the axial direction greater than the bending stiffness in the circumferential direction, it is not necessary to perform processing for increasing the bending stiffness in the axial direction of the central side backup foil 34. Therefore, manufacturing costs of the backup foil member 30 can reduced.

Fourth Embodiment

Figure 10:
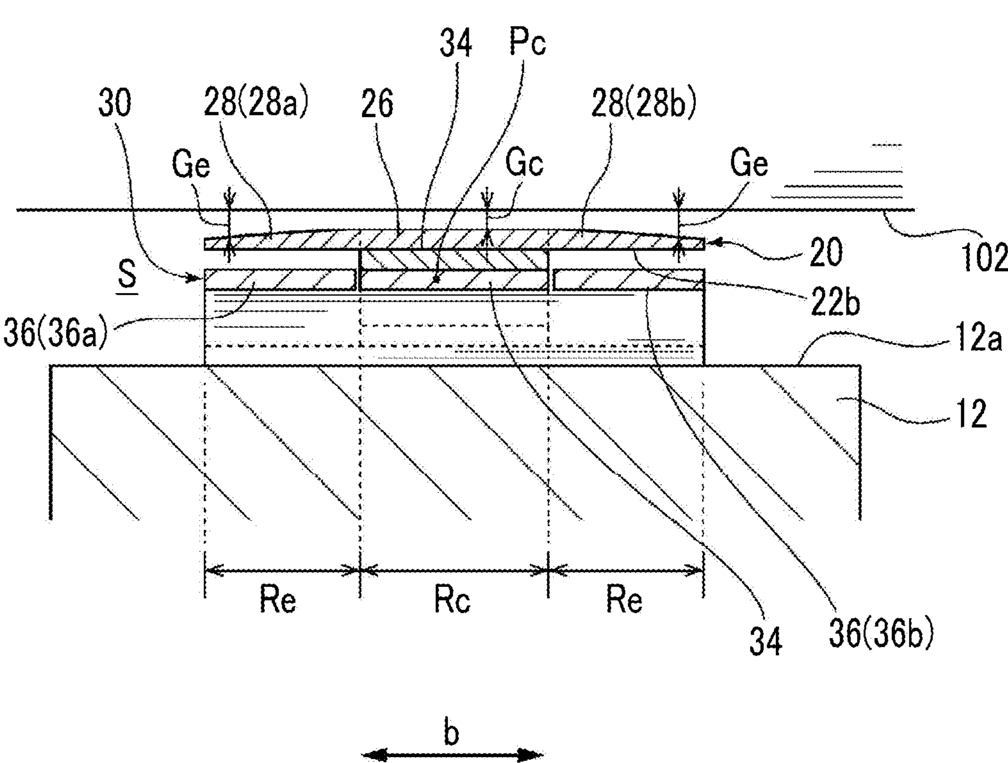
FIG. 10 is a schematic side sectional view of a gas bearing device according to one embodiment.

FIG. 10 is a schematic front sectional view of a gas bearing device 10D according to still another embodiment and is a schematic side sectional view corresponding to FIG. 2 according to the gas bearing device 10A.

As shown in FIG. 10, the gas bearing device 10D is configured such that, in a stationary state (in a non-operation state of the rotary machine including the gas bearing device 10D, that is, at a normal temperature), a gap Gc between the central side top foil 26 supported by the central side backup foil 34 of the undulation forming portion 38 and the rotary shaft 102 is smaller than a gap Ge between an end portion side top foil 28 (28*a*, 28*b*) supported by the end portion side backup foil 36 (36*a*, 36*b*) of the undulation forming portion 38 and the rotary shaft 102 (Gc<Ge).

According to this embodiment, in the non-operation state of the rotary machine including the gas bearing device 10D, since the gap Ge between the end portion side top foil 28 and the rotary shaft 102 is larger than the gap Gc between the central side top foil 26 and the rotary shaft 102, it is possible to suppress the contact of the end portion side region Re of the top foil 20 with the rotary shaft 102 even in a case where the deformation in which the end portion side top foil 28 warps toward the rotary shaft 102 side occurs because of the deformation of the central side top foil 26 caused by gas film pressure applied to the central side top foil 26.

The embodiment shown in FIG. 10 is an embodiment in which the plate thickness of the central side top foil 26 of the arc portion 22 is configured to be larger than the plate thickness of both of the end portion side top foils 28 (28*a*, 28*b*) of the arc portion 22, and the back surface 22*b* of the top foil 20 is configured as a flat surface that is substantially parallel with respect to the rotary shaft 102, resulting in a configuration in which the central gap Gc< the end portion gap Ge.

As means for configuring the plate thickness of the central side top foil 26 to be larger than the plate thickness of both of the end portion side top foils 28, for example, the top foil 20 is coated with a coating agent (for example, a solid lubricant or the like), and in this case, the coating thickness is changed between the central side top foil 26 and the end portion side top foil 28, thereby enabling the above-described gap adjustment.

As another processing means for configuring the plate thickness of the central side top foil 26 to be larger than the plate thickness of both of the end portion side top foils 28, only the end portion side top foil 28 is formed with undulations such as dimples. Consequently, the average gap between the end portion side top foil 28 and the rotary shaft 102 is made larger than the gap Gc of the central side top foil 26. In this case, the roughness of the undulations is, for example, an order of 0.01 mm. In addition, as a method for forming the undulations, a shot peening method or the like can be used.

In another embodiment, the top foil 20 may have a uniform plate thickness over the entire axial region, and the end portion side top foil 28 (28*a*, 28*b*) may have a shape warping toward a side away from the rotary shaft 102 with respect to the central side top foil 26, so that the relationship of the central gap Gc< the end portion gap Ge may be satisfied.

Fifth Embodiment

Figure 11:
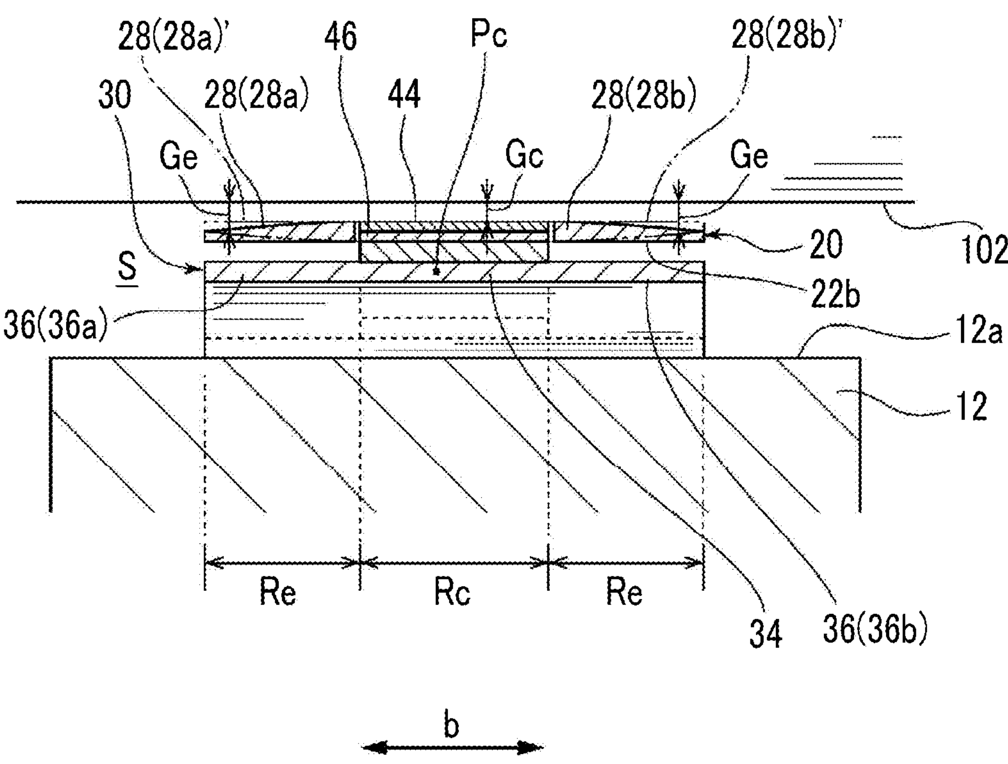
FIG. 11 is a schematic side sectional view of a gas bearing device according to one embodiment.

FIG. 11 is a front sectional view of a gas bearing device 10E according to still another aspect and is a schematic side sectional view corresponding to FIG. 2 according to the gas bearing device 10A.

As shown in FIG. 11, the gas bearing device 10E is configured such that, in a stationary state, the gap Gc between the central side top foil 26 of the arc portion 22 and the rotary shaft 102 is smaller than the gap Ge between the end portion side top foil 28 (28*a*, 28*b*) of the arc portion 22 and the rotary shaft 102 (Gc<Ge), similar to the embodiment shown in FIG. 10.

Further, the central side top foil 26 is configured with an inner layer 44 and an outer layer 46 having different thermal expansion coefficients and being bonded to each other. The inner layer 44 is formed on an inner side of the outer layer 46, that is, closer to the rotary shaft 102 than the outer layer 46 is, and the outer layer 46 is laminated on the inner layer 44 on a side away from the rotary shaft 102 with respect to the inner layer 44. The thermal expansion coefficient of the material forming the inner layer 44 is smaller than the thermal expansion coefficient of the material forming the outer layer 46.

According to this embodiment, in a case where the top foil 20 is raised in temperature from the normal temperature during the operation of the rotary machine (not shown) including the gas bearing device 10E, in the central side top foil 26 that is raised in temperature, the back surface 22*b* is deformed to be substantially parallel with respect to the rotary shaft 102 over the entire axial region of the top foil 20 including the end portion side top foil 28 (28*a*, 28*b*), as indicated by an alternating long and two short dashed line (reference numerals 28 (28*a*, 28*b*)') in FIG. 11, because of the difference in the thermal expansion coefficients between the inner layer 44 and the outer layer 46. In this way, by making the gap between the rotary shaft 102 and the top foil 20 uniform over the entire axial region, the bearing function of the gas bearing device 10E can be favorably maintained.

The gas bearing device 10E according to the above-described embodiment is configured with the two inner and outer layers 44 and 46 having different thermal expansion coefficients only in the central side top foil 26 of the top foil 20, but in another embodiment, the entire axial region of the top foil 20 including the end portion side top foil 28 (28*a*, 28*b*) may be configured with the inner layer 44 and the outer layer 46 having different thermal expansion coefficients.

In the embodiment shown in FIG. 11, by making the plate thickness of the central side top foil 26 larger than the plate thickness of the end portion side top foil 28, the relationship of the central gap Gc<the end portion gap Ge is satisfied, but in another embodiment, the top foil 20 may have a uniform plate thickness in the axial direction, and the end portion side top foil 28 (28*a*, 28*b*) may have a shape warping toward a side away from the rotary shaft 102.

The contents described in each of the above-described embodiments are understood as follows, for example.

1) According to one aspect of the gas bearing device, there is provided a gas bearing device including: a housing (12) that is provided around a rotary shaft (102) and that forms an annular gap(S) with the rotary shaft (102); a top foil (20) that is provided in the annular gap(S) to surround the rotary shaft (102); and a backup foil member (30) that is provided on an outer side of the top foil (20) in the annular gap(S) to surround the top foil (20) and that is configured to elastically support the top foil (20), in which the backup foil member (30) includes a central side backup foil (34) that includes a plurality of layers of backup foils (32) and that is disposed in a central side region (Rc) including at least a center position (Pc) in an axial direction of the rotary shaft (102), and an end portion side backup foil (36 (36*a*, 36*b*)) that includes a single layer or a plurality of layers of backup foils fewer than those of the central side region (Rc) and that is disposed in end portion side regions (Re) located on both sides of the central side region (Rc) in the axial direction.

According to such a configuration, simply by adjusting each of the numbers of backup foils (32) constituting the central side backup foil (34) and the end portion side backup foil (36), the bending stiffness of the central side backup foil (34) can be made greater than the bending stiffness of the end portion side backup foil (36), and the need for plate thickness adjustment of the backup foils (32) constituting the backup foil member (30) is eliminated, so that processing of the backup foil (32) for manufacturing the backup foil member (30) is facilitated.

In this way, since the support strength of the backup foil member (30) with respect to the top foil (20) in the central side region (Rc) can be enhanced, it is possible to suppress the deformation of the central side region (Rc) of the top foil (20) toward the backup foil member (30) side. Therefore, the deformation in which the end portion side region (Re) of the top foil (20) warps toward the rotary shaft (102) side can be suppressed, so that it is possible to suppress wear or damage to the end portion side region (Re) of the top foil (20) coming into contact with the rotary shaft (102).

Further, since at least the central side backup foil (34) is disposed in a plurality of layers, the friction generated between the plurality of layers can efficiently increase the bending stiffness of the central side backup foil (34).

2) According to another aspect of the gas bearing device, in the gas bearing device described in 1), each central side backup foil (34) and each end portion side backup foil (36 (36*a*, 36*b*)) are configured as separate bodies from each other and are formed in undulating shapes along a circumferential direction of the rotary shaft (102), and a pitch of undulations of each central side backup foil (34) is smaller than a pitch of undulations of each end portion side backup foil (36).

According to such a configuration, by making the pitch of the undulations of the central side backup foil (34) smaller than the pitch of the undulations of the end portion side backup foil (36), the bending stiffness of the central side backup foil (34) can be further increased as compared with the bending stiffness of the end portion side backup foil (36). In addition, since the central side backup foil (34) and the end portion side backup foil (36) are each configured as a separate body, it is easy to perform processing of forming undulations having different pitches from each other in the backup foils.

3) According to still another aspect of the gas bearing device, in the gas bearing device described in 1) or 2), each central side backup foil (34) and each end portion side backup foil (36 (36*a*, 36*b*)) have the same plate thickness.

According to such a configuration, all the backup foils (32) constituting the central side backup foil (34) and the end portion side backup foil (36) can be easily manufactured by using a plate material having a uniform plate thickness only through simple processing such as cutting.

4) According to still another aspect of the gas bearing device, in the gas bearing device described in any one of 1) to 3), a central side top foil (26) of the top foil (20) that is supported by the central side backup foil (34) has a bending stiffness in the axial direction greater than a bending stiffness in a circumferential direction of the rotary shaft.

According to such a configuration, since the central side top foil (26) has a bending stiffness in the axial direction greater than the bending stiffness in the circumferential direction, the deformation of the central side top foil (26) due to the gas film pressure applied to the bearing surface (22*a*) of the central side top foil (26) can be suppressed. As a result, it is possible to reduce the deformation, in which the end portion side region (Re) of the top foil (20) warps toward the rotary shaft (102) side, to a small amount.

5) According to still another aspect of the gas bearing device, in the gas bearing device described in 4), the central side top foil (26) is formed in an undulating shape along the circumferential direction at least in a part of the circumferential direction.

According to such a configuration, simply by performing bending such as forming the central side top foil (26) in the undulating shape along the circumferential direction, the bending stiffness in the axial direction of the central side top foil (26) can be made greater than the bending stiffness in the circumferential direction, so that the degree of freedom in selecting the material forming the top foil (20) can be expanded. Therefore, it is possible to use an inexpensive material, thereby enabling cost reduction.

6) According to still another aspect of the gas bearing device, in the gas bearing device described in 4) or 5), a plurality of rod-shaped members (50) that are provided on a back surface (22*b*) of the central side top foil (26) and that extend in the axial direction and are discretely disposed in the circumferential direction are further provided.

According to such a configuration, by providing the rod-shaped members (50) on the back surface (22*b*) of the central side top foil (26), the bending stiffness in the axial direction of the central side top foil (26) can be enhanced, so that it is possible to effectively suppress the deformation in which the end portion side region (Re) of the top foil (20) warps toward the rotary shaft (102) side.

7) According to still another aspect of the gas bearing device, in the gas bearing device described in 6), a thermal expansion coefficient of the plurality of rod-shaped members (50) is smaller than a thermal expansion coefficient of a material forming the central side top foil (26).

According to such a configuration, the thermal expansion coefficient of the rod-shaped member (50) is smaller than the thermal expansion coefficient of the central side top foil (26). Therefore, in a case where the temperature of the rotary machine including the gas bearing device (10) is raised during operation, the central side top foil (26) is deformed to warp in a direction away from the rotary shaft (102) because of the difference in the thermal expansion coefficients between the central side top foil (26) and the rod-shaped member (50). As a result, since the deformation in which the end portion side region (Re) of the top foil (20) warps toward the rotary shaft (102) side is suppressed, it is possible to effectively suppress the contact of the end portion side region (Re) of the top foil (20) with the rotary shaft (102).

8) According to still another aspect of the gas bearing device, in the gas bearing device described in any one of 1) to 7), each central side backup foil (34) has a bending stiffness in the axial direction greater than a bending stiffness in a circumferential direction of the rotary shaft (102).

According to such a configuration, since the bending stiffness in the axial direction of the central side backup foil (34) is greater than the bending stiffness in the circumferential direction, it is possible to enhance the support strength of the central side backup foil (34) that supports the central side top foil (26) from the outer side. Consequently, since the deformation of the central side top foil (26) with respect to the gas film pressure applied to the central side top foil (26) can be suppressed, the deformation in which the end portion side region (Re) of the top foil (20) warps toward the rotary shaft (102) side can be suppressed. Therefore, it is possible to suppress the contact of the end portion side region (Re) of the top foil (20) with the rotary shaft (102).

9) According to still another aspect of the gas bearing device, in the gas bearing device described in 8), each central side backup foil (34) is made of an anisotropic material having a bending stiffness in the axial direction greater than a bending stiffness in the circumferential direction of the rotary shaft (102).

According to such a configuration, since the central side backup foil (34) is made of the anisotropic material having a bending stiffness in the axial direction greater than the bending stiffness in the circumferential direction, it is not necessary to perform processing for increasing the bending stiffness in the axial direction of the central side backup foil (34), thereby enabling cost reduction.

10) According to still another aspect of the gas bearing device, in the gas bearing device described in any one of 1) to 9), in a stationary state, a gap (Gc) between the rotary shaft (102) and a central side top foil (26) of the top foil (20) that is supported by the central side backup foil (34) is smaller than a gap (Ge) between the rotary shaft (102) and an end portion side top foil (28 (28*a*, 28*b*)) of the top foil (20) that is supported by the end portion side backup foil (36 (36*a*, 36*b*)).

According to such a configuration, in the non-operation state of the rotary machine including the gas bearing device (10), since the gap (Ge) between the end portion side top foil (28) and the rotary shaft (102) is larger than the gap (Gc) between the central side top foil (26) and the rotary shaft (102), it is possible to suppress the contact of the end portion side region (Re) of the top foil (20) with the rotary shaft (102) even in a case where the deformation in which the end portion side top foil (36) warps toward the rotary shaft (102) side occurs because of the deformation of the central side top foil (26) caused by gas film pressure applied to the central side top foil (26).

11) According to still another aspect of the gas bearing device, in the gas bearing device described in 10), the central side top foil (26) is configured with two layers (44, 46) having different thermal expansion coefficients and being bonded to each other, and a thermal expansion coefficient of a material forming an inner layer (44) of the two layers (44, 46) is smaller than a thermal expansion coefficient of a material forming an outer layer (46) of the two layers (44, 46).

According to such a configuration, in a case where the gas bearing device (10) is raised in temperature during the operation of the rotary machine including the gas bearing device (10), the central side top foil (26) that is raised in temperature is deformed to be substantially parallel with respect to the rotary shaft (102) over the entire axial region of the top foil (20) including the end portion side top foil (28) because of the difference in the thermal expansion coefficients between the two layers (44, 46). In this way, by making the gap between the rotary shaft (102) and the top foil (20) uniform over the entire axial region, the bearing function of the gas bearing device (10) can be favorably maintained.

The invention claimed is:

1. A gas bearing device comprising:
a housing that is provided around a rotary shaft and that forms an annular gap with the rotary shaft;
a top foil that is provided in the annular gap to surround the rotary shaft; and
a backup foil member that is provided on an outer side of the top foil in the annular gap to surround the top foil and that is configured to elastically support the top foil,
wherein the backup foil member includes:
a central backup foil that includes a plurality of layers of backup foils and that is disposed in a central region including at least a center position of an axial length of the backup foil member, and
an end portion backup foil that includes a single layer or a plurality of layers of backup foils fewer than those of the central region and that is disposed in an end portion region located on a side of the central region in the axial direction.

2. The gas bearing device according to claim 1,
wherein the central backup foil and the end portion backup foil are configured as separate bodies from each other and are formed in undulating shapes along a circumferential direction of the rotary shaft, and
a pitch of undulations of the central backup foil is smaller than a pitch of undulations of the end portion backup foil.

3. The gas bearing device according to claim 1,
wherein the central backup foil and the end portion backup foil have the same plate thickness.

4. The gas bearing device according to claim 1,
wherein a central top foil of the top foil that is supported by the central backup foil has a bending stiffness in the axial direction greater than a bending stiffness in a circumferential direction of the rotary shaft.

5. The gas bearing device according to claim 4, further comprising:
a plurality of rod-shaped members that are provided on a back surface of the central top foil and that extend in the axial direction and are discretely disposed in the circumferential direction.

6. The gas bearing device according to claim 5,
wherein a thermal expansion coefficient of the plurality of rod-shaped members is smaller than a thermal expansion coefficient of a material forming the central top foil.

7. The gas bearing device according to claim 1,
wherein the central backup foil has a bending stiffness in the axial direction greater than a bending stiffness in a circumferential direction of the rotary shaft.

8. The gas bearing device according to claim 7,
wherein the central backup foil is made of an anisotropic material having a bending stiffness in the axial direction greater than a bending stiffness in the circumferential direction of the rotary shaft.

9. The gas bearing device according to claim 1, wherein, in a stationary state, a gap between the rotary shaft and a central top foil of the top foil that is supported by the central backup foil is smaller than a gap between the rotary shaft and an end portion top foil of the top foil that is supported by the end portion backup foil.

10. The gas bearing device according to claim 9, wherein the central top foil is configured with two layers having different thermal expansion coefficients and being bonded to the other, and a thermal expansion coefficient of a material forming an inner layer of the two layers is smaller than a thermal expansion coefficient of a material forming an outer layer of the two layers.

* * * * *